March 30, 1937.  A. L. PARKER  2,075,458
DISK VALVE ASSEMBLY
Filed Sept. 13, 1935  2 Sheets—Sheet 1
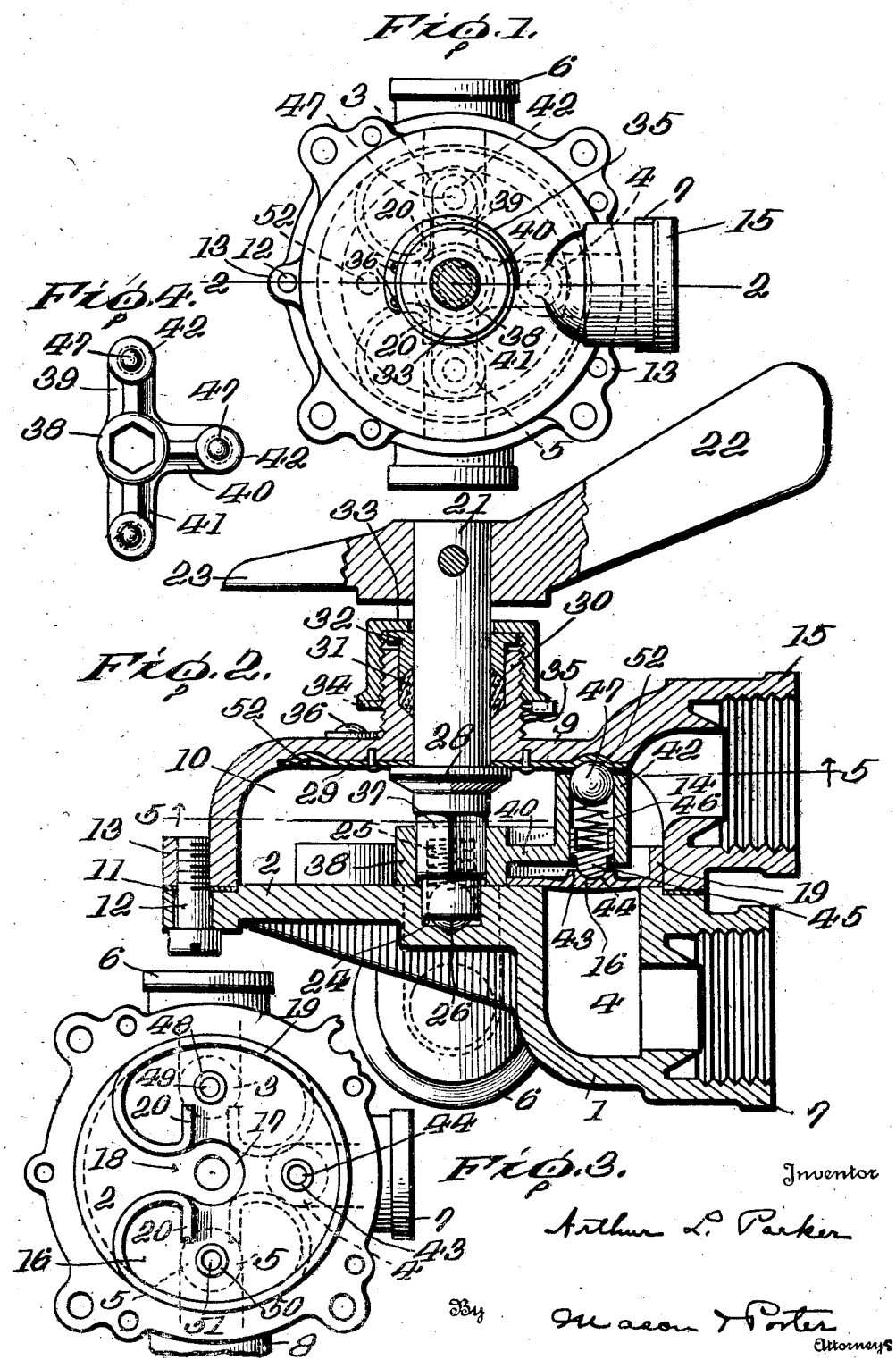

March 30, 1937.                A. L. PARKER                  2,075,458
                           DISK VALVE ASSEMBLY
                         Filed Sept. 13, 1935            2 Sheets-Sheet 2
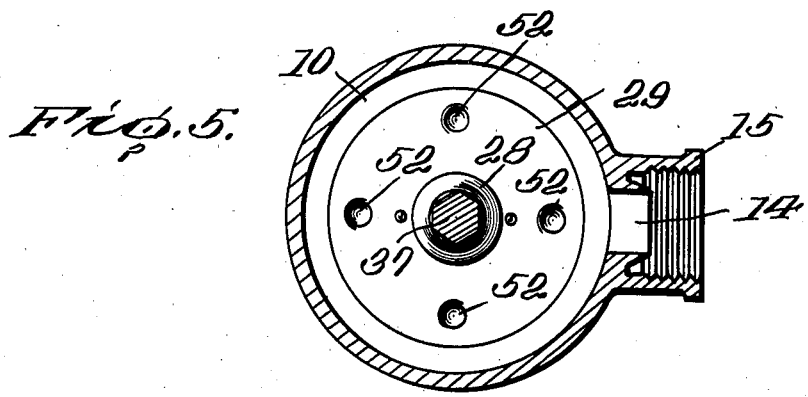
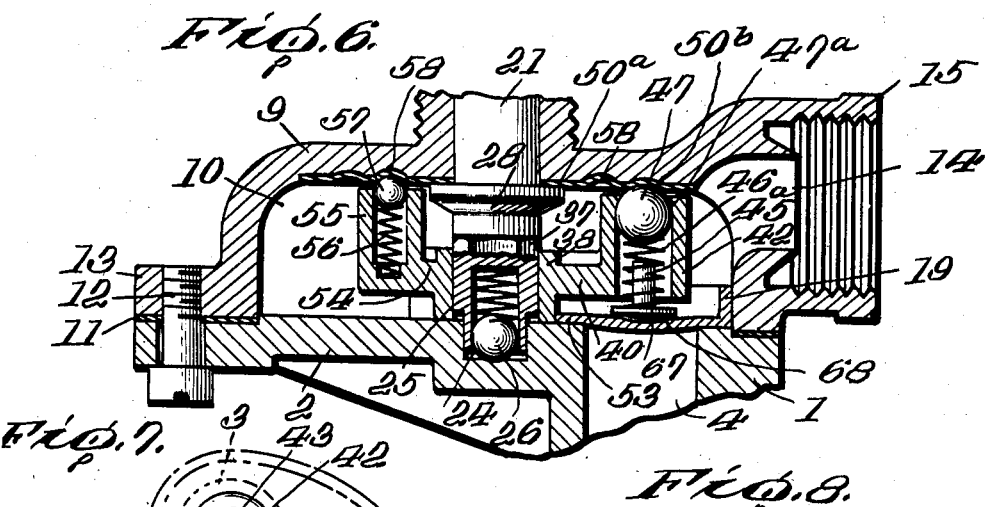
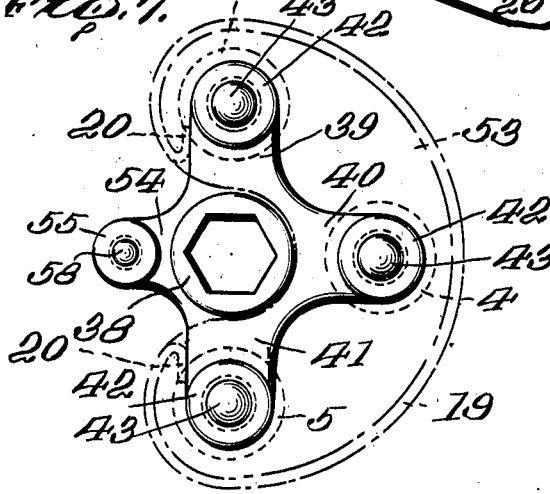
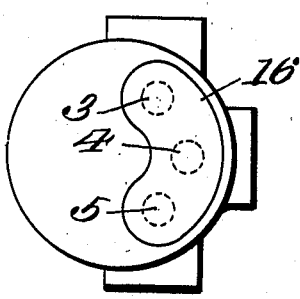
Inventor
Arthur L. Parker
By Mason & Porter
Attorneys Patented Mar. 30, 1937

2,075,458

UNITED STATES PATENT OFFICE 2,075,458

DISK VALVE ASSEMBLY

Arthur L. Parker, Cleveland, Ohio

Application September 13, 1935, Serial No. 40,507

11 Claims. (Cl. 251—90)

The invention relates to new and useful improvements in a valve assembly having a valve disk which may be turned so as to selectively control a plurality of ports.

An object of the invention is to provide a valve with devices operating on a valve disk at a plurality of spaced points for holding the same firmly in contact with the valve seat with which it cooperates.

A further object of the invention is to provide a valve of the above type wherein the valve disk holding devices are independent of each other and so constructed as to impose a yielding pressure against the valve disk.

A still further object of the invention is to provide a valve of the above type with an operating stem connected to the valve disk so that said stem is free to move endwise relative to said valve disk.

A still further object of the invention is to provide a valve of the above type wherein the holding devices which seat the valve disk are carried by operating arms connected to a common stem which operates through said holding means for turning the disk.

These and other objects will in part be obvious and will in part be hereinafter more fully disclosed.

In the drawings—

Figure 1 is a plan view of a disk valve assembly embodying the improvements;

Fig. 2 is a sectional view on the line 2—2 of Fig. 1;

Fig. 3 is a view showing in plan the valve body with the valve disk in place and positioned in full lines so as to cover all of the ports, and in broken lines for uncovering one of the ports;

Fig. 4 is a plan view of the operating disk arms;

Fig. 5 is an inside plan view of the valve cap;

Fig. 6 is a view similar to Fig. 2 showing a modified form of valve holding and operating means;

Fig. 7 is a view showing more or less diagrammatically and in plan the holding and operating means for the valve disk and the shape of the valve disk; and Fig. 8 is a view showing diagrammatically a different arrangement of ports and the valve disk for closing the same so that one, two or all three of the ports may be opened at the same time.

The invention has to do with a disk valve assembly which is particularly adapted for controlling the flow of fluid from a series of inlet ports to a single discharge port. The valve assembly as illustrated in Figures 1 to 5 includes a body 1 having a valve seat 2 which is provided with a plurality of inlet ports 3, 4 and 5. Associated with the inlet port 3 is a coupling 6 to which a pipe may be attached. Also associated with the inlet ports 4 and 5 are similar couplings 7 and 8. Pipes leading from these couplings 6, 7 and 8 are preferably connected to separate tanks for supplying fluid. Attached to the body 1 is a cap 9 which is provided with a chamber 10. Between the cap and body is a gasket 11, and the cap and body are secured together by bolts 12 which, as shown, pass freely through the body and are threaded into the cap. The cap and body are also provided with apertured lugs 13 by which the valve assembly may be attached to a suitable supporting means.

The cap 9 is provided with an outlet port 14 with which is associated a coupling 15 to which a pipe may be attached. This pipe leads to the desired place where the fluid is to be delivered.

Located within the chamber 10 of the cap 9 is a valve disk 16. This valve disk, as shown in Figure 3, is shaped at the center thereof so as to provide a clearance space 17. It is also shaped radially so as to provide a space 18 which may be brought into register with one of the ports so as to provide a free passage for the fluid through said port into the chamber 10. The valve disk is also provided with an integral flange 19 which extends all the way around the periphery of the valve disk and along the sides of the space 18, the inner ends of the flange 20, 20 extending outwardly and into the body of the disk. This flange is for the purpose of stiffening the valve disk. The valve disk, as noted above, makes contact with the valve seat 2. The contacting face of the valve disk and the valve seat are initially shaped and lapped so that they make very intimate contact with each other throughout the entire extent of the valve disk. The valve disk is shaped so that the flange 19 makes guiding contact with the inner wall of the cap 9.

Located centrally of the cap 9 is a valve stem 21 to which is attached a handle 22. Said handle is provided preferably with a pointer 23 which may be utilized for indicating the setting of the valve disk relative to the ports. This valve stem extends down through the cap and into a recess 24 in the body of the valve. The lower end of the valve stem is provided with a housing for a spring 25 and a ball 26. The ball 26 contacts with a seat at the bottom of the recess 24. The valve stem is provided with a flange 28 and the spring bearing against the ball, forces the stem upward in the chambered cap until said flange 28 makes a very tight turning fit with the cap. As shown in the present embodiment of the invention, there is a wear plate 29 attached to the inner face of the cap, and this flange 28 bears against the wear plate.

The cap is provided with an integral sleeve 30 which surrounds the valve stem 21 and located in this sleeve is a packing 31. A packing follower 32 surrounds the stem and bears against the packing, and a packing cap 33 surrounds the sleeve 30 and has threaded engagement therewith. This cap presses the follower against the packing and provides a tight joint between the valve stem and the cap. The lower edge of the packing cap 33 is provided with a series of notches 34 and a spring locking dog 35 fixed to the cap by screws 36 is adapted to engage one of the notches for holding the packing cap in an adjusted position. By releasing the holding dog, the cap may be screwed further down to increase the pressure of the follower against the packing, and then the cap again locked in a set position.

The valve stem between the flange 28 and the lower end thereof is hexagonal in cross section, as indicated at 37. Mounted on this portion of the valve stem is a hub 38 carrying, as shown, three disk arms, 39, 40 and 41. The hub has a hexagonal opening which fits the stem so that the hub is free to slide on the stem or the stem on the hub, while the hub cannot rotate on the stem. When the stem is turned, the hub will be turned, and this will turn the arms carried thereby. Each of these disk arms is provided with devices which bear on the valve disk at a plurality of spaced points. The arms overlie the disk and each arm is provided with a sleeve spaced radially from the center of the stem, practically the same distance as the center of the ports in the valve seat. The devices bearing on the valve disk are all similar in construction, and a detail description of one will answer for the others. The disk arm 40, as shown in Fig. 2, carries a sleeve 42. The valve disk 16 is provided with a raised portion 43 and centrally of the raised portion is a recess 44. Mounted in the sleeve 42 is a stud 45, the lower face of which is shaped so as to fit the recess 44. The upper part of the stud is recessed to form a seat for a spring 46. The spring bears against a ball 47. The spring is so tensioned that it forces the stud 45 against the valve disk and presses the valve disk against the valve seat. The valve disk is provided with a raised portion 48 which is directly beneath the sleeve 42 carried by the arm 39. This raised portion has a seat 49 for a stud similar to the stud 45, and associated with said stud is a spring and ball so that the valve disk is pressed upon in the region of this raised portion 48. There is a similar raised portion 50 with a seat 51 associated with the arm 41 so that the valve is pressed upon at a plurality of points. These points where pressure is applied to the valve disk are so spaced as to be located directly over the center of the ports when the valve disk is positioned for closing the ports.

When the valve disk is in closed position, the pressure of the holding device associated with each port is, as noted, centrally of the disk portion which is over the port. The valve disk is made of light material and the pressure of the holding device centrally over the section covering the port will flex or bend the metal slightly within its elastic limit, so that the valve disk will make intimate and tight contact with the peripheral edge of the port. This makes a tight seal in the immediate region where the valve disk is subjected to the fluid pressure and insures a tight closure of all of the ports. As noted, the flexing of the valve disk is within the elastic limits of the metal so that the valve disk can be readily moved to open one of the ports without releasing the other ports. When the valve disk is moved to open one port, the holding devices are centered over the other two ports which are closed and operate in the same manner to tightly seat the valve at said ports.

As shown, the wear plate 29 extends radially beyond the path of movement of the disk arms and the cap and wear plate are provided with a series of recesses 52 which are located, respectively, directly over the center of the ports in the valve seat.

As a means for turning the valve disk, the inturned flanges 20, 20 are so positioned as to engage against the outer faces of the arms 39 and 41. Inasmuch as these flanges contact with the disk arms at opposite sides of the valve stem, a turning of the valve stem would turn the disk arms, and through the flanges the valve disk may be positively turned either in a clockwise or in a counterclockwise direction. When pressure is applied to the handle for locating the valve disk, the balls 47 will yield and pass out of their holding recesses and move along the wear plate 29 until they are brought into register with the recess associated with the adjacent port. This provides a yielding stop for locating the valve disk properly relative to the ports.

When the parts are positioned as shown in the broken lines in Fig. 3, then the ports 3 and 5 are closed, and the port 4 is opened, so that fluid will flow through into the chamber 10 and thence out through the port 14. The valve disk can be readily turned so as to close the port 4 and open the port 3, or close both of the ports 3 and 4 and open the port 5. Then again, it may be turned so as to close all three of the ports as indicated in Fig. 3. When the ports are all closed, then it is that the holding devices are centered directly over the ports and independently bear on the valve disk for holding it in tight contact with the valve seat in the region surrounding the ports.

Inasmuch as the valve stem is free to move endwise in the hub 38, the spring 25 will hold the flange 28 in tight contact with the wear plate and thus aid the packing in providing a tight joint between the valve stem and the cap. Furthermore, the valve stem does not in any way limit the action of the holding means which operates on the valve disk for holding it against the valve seat. The pressure of the holding devices, on the one hand, is against the cap and on the other hand, against the valve disk. As noted above, each holding device acts independently of the others, so that one does not in any way limit the action of the others.

In Figures 6 and 7, there is shown a modified form of valve holding and operating means. The arrangement of the ports is the same as in Figures 1 to 5. The valve disk 53 is of slightly different shape. It is, however, of sufficient extent as to cover all three of the ports at the same time. The valve holding and turning means includes a hub 38 which is similar to that described in connection with Figures 1 to 5. This hub is mounted on the valve stem 21 so that it turns therewith but is free to move endwise of the stem, and the stem is free to move endwise therein. There is a ball 26 at the lower end of the stem and a spring 25 associated therewith which functions in precisely the same manner as described above. Extending from the hub 38 are three disk arms 39, 40 and 41, each of which is provided with a sleeve 42. Located in each sleeve is a ball 47. The upper inner edge of the sleeve is bent inwardly as indicated at 47a so as to serve as a retainer to hold the ball in place when the parts are disassembled. Beneath the ball 47 is a spring 46. Located centrally of the sleeve is a stud 45a which has an extended flanged head 67 against which the lower end of the spring 46 bears. The spring at its upper end bears against the ball 47. The under face of this head 67 is curved slightly to conform to a seat 68 on the upper face of the valve disk. Located within the valve cap is a wear plate 50a which is similar to the wear plate 29 except that there is an annular groove 50b in the wear plate in which the balls 47 run. As noted above, there is a sleeve on each disk arm, and in each arm is a ball, spring and stud which serve as a holding device for the valve disk. These holding devices are separate and independent of each other. When the valve disk is positioned for closing all three ports, then there is a holding device bearing on the valve disk directly above and centrally of each port. This will cause the valve disk to flex or bow slightly as indicated in Fig. 6. This bending of the disk is within the elastic limits of the metal. It insures that the valve disk will make a very tight seat at the perimeter of the port preventing any fluid from passing from the closed port. When the valve disk is turned through the turning of the valve stem, the metal springs back into the plane of the valve disk so as not to mar the valve seat between ports in any way. The valve disk is turned through the disk arms 39 and 41 contacting with the portions 20, 20 of the flanges, as has been described above. As shown in Fig. 6, all three ports are closed. By turning the valve stem in a clockwise direction, the port 3, indicated in broken lines in Fig. 7, will be opened. The ports 4 and 5, indicated in broken lines therein, may be retained closed. By a continued movement of the valve disk in a clockwise direction, the port 4 may be opened and the ports 3 and 5 closed.

Mounted on the hub 38 is an arm 54 which is provided with a sleeve 55. In this sleeve is located a spring 56 which bears against the lower end of the recess and against a ball 57. The wear plate 50a is provided with a series of recesses 58 which are so disposed relative to the ports that the ball 57 will drop into a seat and yieldingly hold the valve disk in a predetermined position relative to the ports. When the holding ball 57 is in the position shown in Fig. 6, then all of the ports are closed. This holding ball 57 is independent of the balls which bear against the wear plate and form a part of the holding devices for seating the valve disk at the ports. The balls 47 bearing against the wear plate do not move into any depression or recess so that the tension of the spring 46 is not reduced in any way when the holding device is centered over the port, as is the case in connection with the construction shown in Figs. 1 to 5.

In Fig. 8 of the drawings, there is shown diagrammatically a valve wherein the ports 3, 4 and 5 are completely located at one side of a diametrical line centrally through the valve. The valve disk 16 is so dimensioned as to cover all three of these ports. It will readily been seen that the valve disk 16 with the ports arranged as in Fig. 8 can be moved so as to uncover first one and then another, and all of the ports if desired. It can be positioned so as to uncover either the port 3 or 5, but the port 4 cannot be uncovered except in connection with either the port 3 or 5.

It will be understood that many other arrangements of the ports and the shaping of the valve disk may be made, the essential feature residing in the fact that the valve disk cooperates with a series of ports and is held in contact with the valve seat by separate holding devices, one of which centers over a port whenever it is closed and operates to bow or flex the valve disk so as to insure a tight seating of the valve disk in the region of the port.

It will be understood that various changes in the details of construction may be made without departing from the spirit of the invention as set forth in the appended claims.

Having thus described the invention, what I claim as new and desire to secure by Letters Patent, is—

1. A valve comprising a body having a seat provided with a plurality of ports, a chambered cap attached to said body and covering said seat, said cap having a port leading to said chamber, a flexible valve disk contacting with said seat and shaped so as to control all of the ports in said seat, devices contacting with said valve disk at a plurality of spaced points for holding said disk in contact with said seat, and means for turning said disk whereby said ports may be selectively controlled, said devices being yielding and disposed so as to flex said valve disk centrally of the ports when said valve disk is positioned for closing the ports.

2. A valve comprising a body having a seat provided with a plurality of ports, a chambered cap attached to said body and covering said seat, said cap having a port leading to said chamber, a flexible valve disk contacting with said seat and shaped so as to control all of the ports in said seat, a series of independent devices contacting with said valve disk, said contacting devices being yielding and disposed so as to bear on said valve disk directly over the center of a port and within the limits of the port when the valve disk is in a set position whereby said valve disk is flexed into the port and caused to make tight contact with the valve seat at the edge of the port.

3. A valve comprising a body having a seat provided with a plurality of ports, a chambered cap attached to said body and covering said seat, said cap having a port leading to said chamber, a valve disk contacting with said seat and shaped so as to control all of the ports in said seat, a valve stem mounted in said cap, a hub mounted on said valve stem so as to turn therewith and move freely endwise on the valve stem, arms projecting from said hub over said valve disk, a yielding device carried by each arm bearing on said valve disk and said cap for seating the valve disk, said devices being so disposed as to bear on said valve disk centrally over a port when the valve disk is in a set position, said devices also operating as a means for turning said valve disk when the stem is turned, and means for holding said valve disk in predetermined set positions.

4. A valve comprising a body having a seat provided with a plurality of ports, a chambered cap attached to said body and covering said seat, said cap having a port leading to said chamber, a flexible valve disk contacting with said seat and shaped so as to control all of the ports in said seat, a valve stem mounted in said cap for rotation only, a hub sleeve mounted on said valve stem for rotation therewith and for endwise movement relative thereto, and independent yielding holding devices carried by said hub and contacting with said valve disk for flexing the same centrally of the ports to effect a tight seal when the valve is closed and for turning the valve disk for selectively controlling the ports.

5. A valve comprising a body having a seat provided with a plurality of ports, a chambered cap attached to said body and covering said seat, said cap having a port leading to said chamber, a flexible valve disk contacting with said seat and shaped so as to control all of the ports in said seat, a valve stem mounted in said cap for rotation only, a hub sleeve mounted on said valve stem for rotation therewith and for endwise movement relative thereto, and independent yielding holding devices carried by said hub and contacting with said valve disk for holding the same seated and whereby said valve disk may be turned for selectively controlling said ports, said holding devices being disposed so as to bear on said disk centrally of each port and within the limits of the ports when said ports are closed, whereby said valve disk is flexed so as to make tight contact with the valve seat at the edges of the ports.

6. A valve comprising a body having a seat provided with a plurality of ports, a chambered cap attached to said body and covering said seat, said cap having a port leading to said chamber, a valve disk contacting with said seat and shaped so as to control all of the ports in said seat, a stem mounted in said cap for rotation, a flange on said stem, yielding means for contacting with the lower end of the stem and forcing said flange into tight contact with the cap, a plurality of yielding holding devices bearing on said valve disk and the cap independently and at spaced points for holding said valve disk seated, means operated by said valve stem and through the holding devices for shifting said valve disk, to different set positions, and means whereby said valve disk is held in predetermined set positions relative to the ports.

7. A valve comprising a body having a seat provided with a plurality of ports, a chambered cap attached to said body and covering said seat, said cap having a port leading to said chamber, a valve disk contacting with said seat and shaped so as to control all of the ports in said seat, a stem mounted in said cap for rotation, a flange on said stem, yielding means for contacting with the lower end of the stem and forcing said flange into tight contact with the cap, a plurality of yielding holding devices bearing on said valve disk and the cap independently and at spaced points for holding said valve disk seated, means operated by said valve stem and through the holding devices for shifting said valve disk to different set positions, and means whereby said valve disk is held in predetermined set positions relative to the ports, said holding devices being disposed so as to bear on the valve disk centrally of each port and within the limits of the ports when the valve disk is in a set position and the ports closed.

8. A valve comprising a body having a seat provided with a plurality of ports, a chambered cap attached to said body and covering said seat, said cap having a port leading to said chamber, a rotatable flexible valve disk contacting with said seat and shaped so as to control all of the ports in said seat, and devices contacting with said valve disk at a plurality of points spaced symmetrically with respect to the ports in said seat for flexing said disk into the ports to make contact with the edge of the valve seat around the ports.

9. A valve comprising a body having a seat provided with a plurality of ports, a chambered cap attached to said body and covering said seat, said cap having a port leading to said chamber, a rotatable flexible valve disk contacting with said seat and shaped so as to control all of the ports in said seat, and devices contacting with said valve disk at a plurality of points spaced symmetrically with respect to the ports in said seat for flexing said disk into the ports to make contact with the edge of the valve seat around the ports, said devices being yielding and operating independently of one another.

10. A valve comprising a valve casing having a port therethrough, a rotatable valve member having a flexible metal portion for controlling the passage of fluid through the port in the valve casing, and means having a predetermined position relative to the flexible metal portion of said valve member so as to be disposed in substantially axial alignment with the port in the valve casing when the valve is closed and rotatable with said valve member for bearing centrally against and flexing the said flexible metal portion centrally into the port in the valve casing when the valve is closed whereby to afford a uniform tight sealing contact between the edge of the port and the valve member.

11. A valve comprising a valve casing having a port therethrough, a rotatable valve member having a flexible metal portion for controlling the passage of fluid through the port in the valve casing, and resilient means having a predetermined position relative to the flexible metal portion of said valve member so as to be disposed in substantially axial alignment with the port in the valve casing when the valve is closed and rotatable therewith for bearing centrally against and flexing the said flexible metal portion centrally into the port in the valve casing when the valve is closed whereby to afford a uniform tight sealing contact between the edge of the port and the valve member.

ARTHUR L. PARKER.